US006753053B2

(12) United States Patent
Futagawa et al.

(10) Patent No.: US 6,753,053 B2
(45) Date of Patent: Jun. 22, 2004

(54) LAMINATED FILM AND PACKAGING BAG

(75) Inventors: Takashi Futagawa, Kagawa-ken (JP); Katsutoshi Ohno, Yokkaichi (JP)

(73) Assignees: Shikoku Kakoh Co., Ltd. (JP); Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 10/002,024

(22) Filed: Nov. 15, 2001

(65) Prior Publication Data

US 2003/0091766 A1 May 15, 2003

(30) Foreign Application Priority Data

Nov. 16, 2000 (JP) ........................................ 2000-349830

(51) Int. Cl.[7] .............................. B32B 7/00; B32B 1/00

(52) U.S. Cl. .................... 428/34.8; 428/35.2; 428/35.4; 428/35.5; 428/35.7; 428/36.6; 428/36.7; 428/36.4

(58) Field of Search ............................... 428/34.8, 35.2, 428/35.4, 35.5, 35.7, 36.6, 36.7, 36.4

(56) References Cited

U.S. PATENT DOCUMENTS

| | | | | | |
|---|---|---|---|---|---|
| 5,387,449 | A | * | 2/1995 | Kunz et al. | 428/35.4 |
| 5,391,423 | A | * | 2/1995 | Wnuk et al. | 428/217 |
| 6,120,860 | A | * | 9/2000 | Bowen et al. | 428/34.2 |
| 6,146,726 | A | * | 11/2000 | Yoshii et al. | 428/35.9 |

FOREIGN PATENT DOCUMENTS

| | | |
|---|---|---|
| JP | 11-77937 | 3/1999 |
| JP | 2000-25184 | 1/2000 |
| JP | 2000-52524 | 2/2000 |
| JP | 2000072150 | 3/2000 |
| JP | 2001054940 | 2/2001 |
| WO | WO 9927350 | 6/1999 |

OTHER PUBLICATIONS

EPO Search Report.

A.J. Melveger, *Laser–Raman Study of Crystallinity Changes in Poly*(*ethylene Terephthalate*), Journal of Polymer Science: Part A–2, vol. 10, pp. 317–322 (1972).

* cited by examiner

*Primary Examiner*—Harold Pyon
*Assistant Examiner*—Chris Bruenjes
(74) *Attorney, Agent, or Firm*—Edwards & Angell, LLP; David G. Conlin; Lisa Swiszcz Hazzard

(57) ABSTRACT

The laminated film of the present invention comprises:

an outermost layer (A) comprising a polybutylene terephthalate homopolymer, a polybutylene terephthalate copolymer or a mixture of the polybutylene terephthalate homopolymer and the polybutylene terephthalate copolymer; and an innermost layer (B) comprising a heat-sealing resin, the outermost layer (A) having a shape factor of not less than 2.2, which shows a peak shape of Raman spectrum thereof and is represented by the following formula (1):

$$\text{Shape factor} = La/Lb \quad (1)$$

wherein La and Lb represent peak widths being present on higher- and lower-frequency sides, respectively, relative to a perpendicular line drawn from a peak top to a base line formed by a tangent line taken before and after the peak based on carbonyl stretching vibration, and being taken along a horizontal line at a height corresponding to one half of an intensity of the peak. The laminated film is prevented from being curled upon heat-sealing.

16 Claims, 1 Drawing Sheet

LAMINATED FILM AND PACKAGING BAG

BACKGROUND OF THE INVENTION

The present invention relates to a laminated film and a packaging bag, and more particularly, to a laminated film which is prevented from being curled upon heat-sealing, and a packaging bag suitably used in a filling and packaging machine, which is produced by heat-sealing the laminated film.

Conventionally, various food and non-food products are packaged by a filling and packaging machine, and there have been used packaging bags produced by heat-sealing an unstretched laminated film. For example, in the case of packaging bags for foods such as hams and sausages, which are required to exhibit a gas-barrier property, there have been used such an unstretched laminated film comprising an outermost layer composed of polyethylene terephthalate (PET) or polyethylene naphthalate (PEN) having an excellent heat resistance, an innermost layer composed of a heat-sealing resin and an intermediate layer composed of a gas-barrier resin, or the like.

However, such conventional packaging bags tend to be curled at an open edge thereof, thereby causing problems when used in a filling and packaging machine. In addition, the unstretched laminated film itself tends to undergo considerable curling prior to being formed into a packaging bag by heat-sealing. For this reason, especially upon the production of pillow-type packaging bags, sealing defects tend to be caused during a so-called center seal process in which opposite edges of the unstretched laminated film are overlapped on each other and heat-sealed together.

As a result of the present inventors' earnest studies for solving the above problems, it has been found that a laminated film produced by a co-extrusion inflation method, having an outermost layer composed of a polymer capable of satisfying specific parameters, is free from curling upon heat-sealing. The present invention has been attained on the basis of this finding.

SUMMARY OF THE INVENTION

It is an object of the present invention to provide a laminated film which is free from curling upon heat-sealing.

It is another object of the present invention to provide a packaging bag suitably used in a filling and packaging machine.

To accomplish the aims, in a first aspect of the present invention, there is provided a laminated film produced by a co-extrusion inflation method, comprising:

- an outermost layer (A) comprising a polybutylene terephthalate homopolymer, a polybutylene terephthalate copolymer or a mixture of the polybutylene terephthalate homopolymer and the polybutylene terephthalate copolymer; and
- an innermost layer (B) comprising a heat-sealing resin,
- said outermost layer (A) having a shape factor of not less than 2.2, which shows a peak shape of Raman spectrum thereof and is represented by the following formula (1):

$$\text{Shape factor}=La/Lb \quad (1)$$

wherein La and Lb represent peak widths being present on higher- and lower-frequency sides, respectively, relative to a perpendicular line drawn from a peak top to a base line formed by a tangent line taken before and after the peak based on carbonyl stretching vibration, and being taken along a horizontal line at a height corresponding to one half of an intensity of the peak.

In a second aspect of the present invention, there is provided a packaging bag obtained by heat-sealing the laminated film as defined in the first aspect.

In a third aspect of the present invention, there is provided a food-packaging bag obtained by heat-sealing the laminated film as defined in the first aspect.

In a fourth aspect of the present invention, there is provided a laminated film produced by a co-extrusion inflation method, comprising:

- an outermost layer (A) comprising a polybutylene terephthalate homopolymer, a polybutylene terephthalate copolymer or a mixture of the polybutylene terephthalate homopolymer and the polybutylene terephthalate copolymer;
- an adhesive resin layer comprising a modified polyolefin resin; and
- an innermost layer (B) comprising a heat-sealing resin,
- said outermost layer (A) having a shape factor of not less than 2.2, which shows a peak shape of Raman spectrum thereof and is represented by the following formula (1):

$$\text{Shape factor}=La/Lb \quad (1)$$

wherein La and Lb represent peak widths being present on higher- and lower-frequency sides, respectively, relative to a perpendicular line drawn from a peak top to a base line formed by a tangent line taken before and after the peak based on carbonyl stretching vibration, and being taken along a horizontal line at a height corresponding to one half of an intensity of the peak.

In a fifth aspect of the present invention, there is provided a laminated film produced by a co-extrusion inflation method, comprising:

- an outermost layer (A) comprising a polybutylene terephthalate homopolymer, a polybutylene terephthalate copolymer or a mixture of the polybutylene terephthalate homopolymer and the polybutylene terephthalate copolymer;
- a first adhesive resin layer comprising a modified polyolefin resin;
- a gas-barrier resin layer (C) comprising polyamide, an ethylene-vinyl acetate copolymer saponification product, polyethylene terephthalate, polyethylene naphthalate or polycarbonate;
- a second adhesive resin layer comprising a modified polyolefin resin; and
- an innermost layer (B) comprising a heat-sealing resin,
- said outermost layer (A) having a shape factor of not less than 2.2, which shows a peak shape of Raman spectrum thereof and is represented by the following formula (1):

$$\text{Shape factor}=La/Lb \quad (1)$$

wherein La and Lb represent peak widths being present on higher- and lower-frequency sides, respectively, relative to a perpendicular line drawn from a peak top to a base line formed by a tangent line taken before and after the peak based on carbonyl stretching vibration, and being taken along a horizontal line at a height corresponding to one half of an intensity of the peak.

DETAILED DESCRIPTION OF THE INVENTION

Figure 1:
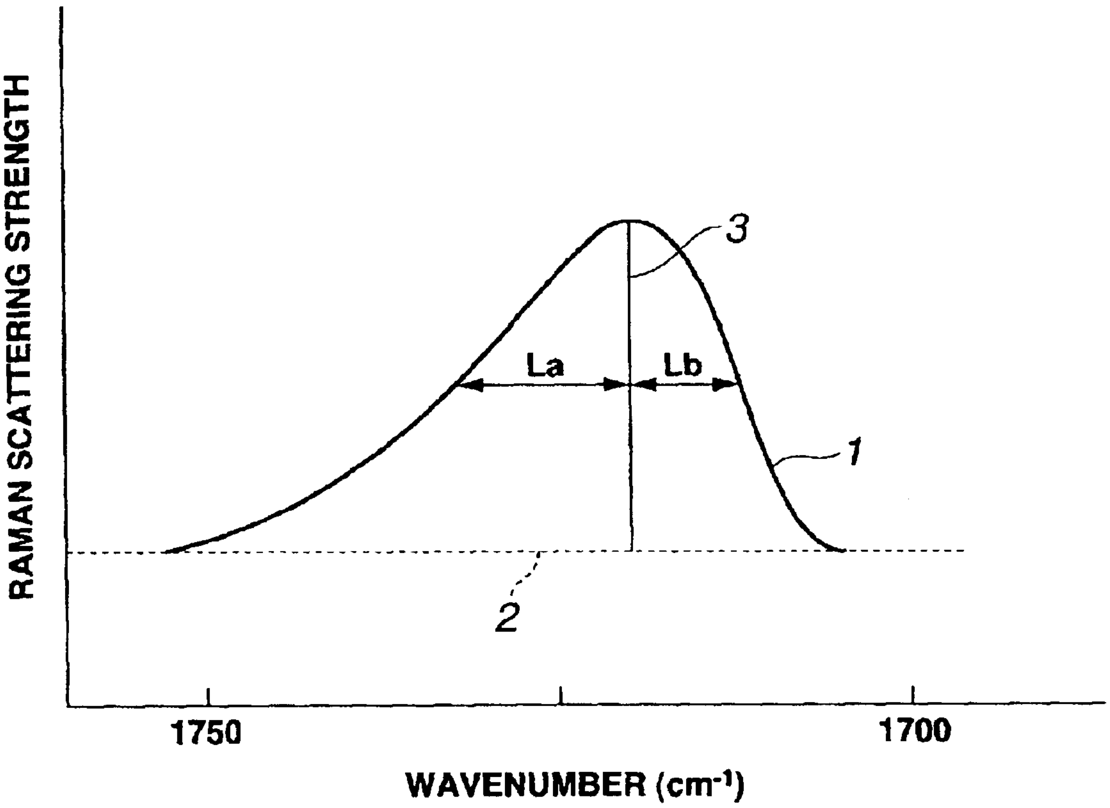
FIG. 1 is an explanatory view of a peak shape of Raman spectrum.

The present invention will be described in detail below.

First, the laminated film of the present invention is described. The laminated film of the present invention comprises at least an outermost layer (A) and an innermost layer (B), which is produced by a co-extrusion inflation method. The outermost layer (A) is composed of a polybutylene terephthalate homopolymer and/or a polybutylene terephthalate copolymer ("polybutylene terephthalate" is hereinafter referred to merely as "PBT"). The innermost layer (B) is composed of a heat-sealing resin.

As the PBT homopolymers and copolymers constituting the outermost layer (A), there may be used known PBT polymers or resins ordinarily used in the application field of packaging films. As other copolymerized components of the PBT copolymers, there may be exemplified dicarboxylic acids such as isophthalic acid, phthalic acid, 2,6-naphthalenedicarboxylic acid, adipic acid, sebacic acid, oxy-carboxylic acids such as p-oxybenzoic acid, or the like; and glycols such as ethylene glycol, diethylene glycol, propylene glycol, 1,4-cyclohexane dimethanol, neopentyl glycol, polyethyleneoxide glycol, polypropyleneoxide glycol, polytetramethyleneoxide glycol or the like. These dicarboxylic acids and glycols may be respectively used singly or in the form of a mixture of any two or more thereof. The PBT copolymer contains PBT units derived from terephthalic acid and butylene glycol in an amount of usually 70 to 99 mol %, preferably 85 to 99 mol %, and the remainder of the PBT copolymer is composed of units derived from the above-described other copolymerized components.

In the present invention, among the above other copolymerized components, polytetramethyleneoxide glycol is preferred. The polytetramethyleneoxide glycol usable in the present invention preferably has a number-average molecular weight of 300 to 6,000, more preferably 500 to 2,000.

The outermost layer (A) preferably contains as an anti-blocking agent, organic or inorganic fine particles from the standpoint of good anti-blocking property upon storage of stacked packaging bags.

Examples of the anti-blocking agent composed of organic fine particles may include fine particles of homopolymers or copolymers of polystyrene, polyethylene, polyamides, polyesters, polyacrylic acid esters, polymethacrylic acid esters, epoxy resins, polyvinyl acetate, polyvinyl chloride or the like, which may further contain a cross-linking agent. Examples of the anti-blocking agent composed of inorganic fine particles may include fine particles of talc, kaolin, silica or calcium carbonate, glass powder, or the like.

The anti-blocking agent usually has an average particle size of about 1 to 10 μm. The amount of the anti-blocking agent used is usually in the range of 100 to 10,000 ppm, preferably 1,000 to 5,000 ppm based on resins. In the present invention, among these anti-blocking agents, organic fine particles are preferred, and fine particles of polyacrylic acid esters or polymethacrylic acid esters are more preferred.

As the heat-sealing resin constituting the innermost layer (B), there may be exemplified high-density polyethylene (HDPE), medium-density polyethylene (MDPE), low-density polyethylene (LDPE), polypropylene (PP), ethylene-vinyl acetate copolymer (EVA), ethylene-methacrylate copolymer (EMA), ethylene-ethyl acrylate copolymer (EEA), ethylene-methyl methacrylate copolymer (EMMA), ethylene-acrylic acid copolymer (EAA), ethylene-methacrylic acid copolymer (EMAA), adhesive polyethylene, ionomer resins, EVA saponification products, linear low-density polyethylene (L-LDPE) or copolymers thereof. Among these heat-sealing resins, those having a melting point lower by at least 50° C. (preferably at least 70° C.) than a melting point of the PBT homopolymer and/or PBT copolymer constituting the outermost layer (A), such as linear low-density polyethylene (L-LDPE), are preferred.

The linear low-density polyethylene (L-LDPE) is a copolymer of ethylene and a $C_3$ to $C_{13}$ α-olefin having an ethylene content of 86 to 99.5 mol %, and is a low-and medium-density polyethylene which is different from LDPE produced by the conventional high-pressure method. The LDPE produced by the high-pressure method has a multi-branched molecular structure, while the L-LDPE has a linear molecular structure. Examples of the α-olefin copolymerized with ethylene in the production of the L-LDPE may include buten-1, penten-1, hexen-1, octen-1,4-methyl penten-1 or the like. The copolymerization of ethylene and the α-olefin may be conducted by low- and medium-pressure methods using a so-called Ziegler-Natta catalyst or metallocene catalyst.

Specific examples of commercially available products of the L-LDPE may include "UNIPOL" produced by Union Carbide Chemicals & Plastics Technology Corporation, "DOWLEX" produced by The Dow Chemical Company, "SCLAIR" produced by DuPont Canada Inc., "MARLEX" produced by Phillips Chemical Company, "NEOZEX" and "ULTZEX" produced by Mitsui Sekiyu Kagaku Co., Ltd., "SUTAMILEX" produced by DSM N. V., or the like.

The laminated film of the present invention may have a gas-barrier resin layer (C) interposed between the outermost layer (A) and the innermost layer (B), if required, especially when used for food-packaging materials requiring a gas-barrier property. Examples of resins constituting the gas-barrier resin layer (C) may include polyamides (PA), ethylene-vinyl acetate copolymer saponification products (EVOH), polyethylene terephthalate (PET), polyethylene naphthalate (PEN), polycarbonate (PC) or the like. Among these resins, polyamides (PA) and ethylene-vinyl acetate copolymer saponification products (EVOH) are preferred, and polyamides (PA) are more preferred.

In the present invention, as the polyamide (PA), there may be used those polyamides produced by polycondensation of (1) lactam having a 3 or more-membered ring or (2) polymerizable ω-amino acid, or polycondensation of (3) diamine with dicarboxylic acid.

Specific examples of the lactam having a 3 or more-membered ring may include ε-caprolactam, enantholactam, α-pyrrolidone, α-piperidone or the like. Specific examples of the polymerizable ω-amino acid may include 6-amino hexanoic acid, 7-amino heptanoic acid, 11-amino undecanoic acid, 9-amino nonanoic acid or the like.

Specific examples of the diamine may include hexamethylenediamine, nonamethylenediamine, undecamethylenediamine, dodecamethylenediamine, m-xylylenediamine or the like. Specific examples of the dicarboxylic acid may include terephthalic acid, isophthalic acid, adipic acid, sebacic acid, dodecandioic acid, glutaric acid or the like.

Specific examples of the polyamides used in the present invention may include nylon 4, 6, 7, 8, 11, 12, 6.6, 6.10, 6.11, 6.12, 6T, 6/6.6, 6/12, 6/6T, 6I/6T or the like.

The laminated film of the present invention may further have adhesive resin layers between the respective layers. The adhesive resin layers may be usually composed of a modified polyolefin resin (APO). The APO may be produced by copolymerizing and/or graft-polymerizing α,β-unsaturated carboxylic acid or its derivative with a polyolefin resin containing ethylene and/or propylene as main components.

Examples of the above polyolefin resin may include polyethylene, polypropylene, ethylene-propylene copolymer, ethylene-buten-1 copolymer, ethylene-vinyl acetate copolymer, ethylene-acrylic acid copolymer, ethylene-ethyl acrylate copolymer, ethylene-sodium acrylate copolymer or the like.

Examples of the above α,β-unsaturated carboxylic acid or its derivative which is copolymerized with the polyolefin resin, may include acrylic acid, methacrylic acid, methyl methacrylate, sodium acrylate, zinc acrylate, vinyl acetate, glycidyl methacrylate or the like. The α,β-unsaturated carboxylic acid or its derivative may be contained in an amount of not more than 40 mol % in a molecular chain of the APO. As the copolymerized modified polyolefin resin, there may be exemplified ethylene-vinyl acetate copolymer, ethylene-acrylic acid copolymer, ethylene-ethyl acrylate copolymer, ethylene-sodium acrylate copolymer or the like.

Examples of the above α,β-unsaturated carboxylic acid or its derivative which is grafted to the polyolefin resin, may include acrylic acid, methacrylic acid, ethacrylic acid, maleic acid, fumaric acid, or anhydrides or esters of these acids. Among these modifying compounds, maleic anhydride is preferred. The amount of the α,β-unsaturated carboxylic acid or its derivative grafted is usually 0.01 to 25% by weight, preferably 0.05 to 1.5% by weight based on the weight of the polyolefin resin.

The graft polymerization reaction may be conducted by an ordinary method, i.e., by melt-blending the polyolefin resin with the α,β-unsaturated carboxylic acid or its derivative at a resin temperature of 150 to 300° C. Upon the graft polymerization reaction, an organic peroxide such as α,α'-bis-t-butylperoxy-p-diisopropylbenzene may be added in an amount of 0.001 to 0.05% by weight in order to effectively conduct the reaction.

The laminated film of the present invention may be produced by a co-extrusion inflation method, and kept in a substantially unstretched condition. The feature of the laminated film of the present invention lies in that the outermost layer (A) thereof has a shape factor of not less than 2.2 which shows a peak shape of Raman spectrum thereof and is represented by the following formula (1):

$$\text{Shape factor}=La/Lb \qquad (1)$$

wherein La and Lb represent peak widths being present on higher- and lower-frequency sides, respectively, relative to a perpendicular line drawn from a peak top to a base line formed by a tangent line taken before and after the peak based on carbonyl stretching vibration, and being taken along a horizontal line at a height corresponding to one half of an intensity of the peak.

In FIG. 1, there is shown an explanatory view of the peak shape of Raman spectrum, wherein reference numeral (1) represents a peak based on carbonyl stretching vibration, reference numeral (2) represents a base line, and reference numeral (3) represents a perpendicular line.

The peak (1) is observed at a wavenumber of about 1,719 $cm^{-1}$. As a result of analyzing the curling property and Raman spectrum of many kinds of laminated films according to the present invention, it has been found that when the shape factor of the outermost layer (A) as defined by the above formula (1) is not less than 2.2, the obtained laminated film can be effectively prevented from being curled upon heat-sealing.

Hitherto, it is known that the difference in crystallinity (density) of PBT is well reflected by a peak shape based on carbonyl stretching vibration ("J. Polymer Sci.", A-2, Vol. 10, p. 317 (1972)). It is suggested that the peak width (La) of the peak (1) on a higher-frequency side thereof considerably depends upon the amount of an amorphous portion of PBT. The upper limit of the shape factor as defined by the formula (1) is not particularly restricted, and is usually 2.8.

The measurement of Raman spectrum for determining the shape factor (La/Lb) may be conducted under the following conditions using the following measuring device.

<Measuring Device>

Device: "NRS-2100" manufactured by Nippon Bunko Co., Ltd.;

Detector: High-sensitive CCD detector;

Excitation light source: Ar+ion laser; and

Excitation wavelength: 514.5 nm.

<Measuring Conditions>

Laser output: 100 mW (excitation light intensity on the surface of specimen);

Beam diameter: 1 mm (beam diameter on the surface of specimen); and

Integration time: 180 sec.

The above-described laminated film of the present invention may be produced, for example, by a water-quenching method. Here, the water-quenching method usually means such a method of introducing a film extruded from a die into a water vessel disposed underneath the die for cooling, and then winding up the obtained film onto a roll. More specifically, the water vessel having a sizing ring therein is usually disposed underneath the ring-shaped die, and a guide plate and a winding roll are sequentially disposed underneath the water vessel. A plurality of kinds of raw resins is co-extruded into a film through the ring-shaped die while keeping the film in a substantially unstretched condition. The resultant film is cooled by passing through the sizing ring, thereby obtaining a tubular laminated film. The tubular laminated film is fed along the guide plate, folded and then wound up on the winding roll in the form of a double film (tubular film).

The thus obtained laminated film of the present invention is a substantially unstretched film, and preferably has a heat-shrinkage percentage of not more than 5% in each of longitudinal (MD) and transverse (TD) directions when measured according to JIS K 6734.

In the laminated film of the present invention, for example, the outermost layer (A) has a thickness of usually 2 to 50 μm, preferably 4 to 30 μm, more preferably 6 to 20 mm; the innermost layer (B) has a thickness of usually 20 to 100 μm, preferably 30 to 70 μm, more preferably 30 to 50 μm; the gas-barrier resin layer (C) has a thickness of usually 5 to 70 μm, preferably 10 to 50 μm, more preferably 10 to 30 μm; and each adhesive resin layer formed between the above respective layers has a thickness of usually 2 to 30 μm, preferably 5 to 15 μm.

Further, in the present invention, the thickness of the innermost layer (B) (heat-sealing resin layer) is as large as two or more times the thickness of the outermost layer (A) (PBT resin layer). The reason therefor is as follows. That is, it may be difficult to form PBT into a film because of its low melt tension (i.e., low shape retention property).

Consequently, the thickness of the heat-sealing resin layer having a high melt tension is increased to compensate the low shape retention property of PBT. In this case, the upper limit of the ratio of the thickness of the innermost layer (B) to that of the outermost layer (A) is usually 10:1.

The laminated film of the present invention can be effectively prevented from being curled upon heat-sealing and, therefore, is suitably applicable to various packaging bags. For example, upon the production of pillow-type packaging bags, the occurrence of defective seal can be prevented during the center seal process in which opposite edges of the unstretched laminated film are overlapped on each other and heat-sealed together.

Next, the packaging bag of the present invention is explained below. The packaging bag of the present invention can be produced by heat-sealing the edges of the tubular laminated film. The heat-sealing may be conducted by a known gusseting technique.

That is, the gusseting technique means such a processing method in which the edges of the tubular film are folded-in and heat-sealed. More specifically, in an ordinary gusseting process, the respective edges of the tubular film are formed into a rectangular shape in section, and a pair of opposed walls thereof are folded into a valley shape inwardly from a substantially center of each wall. Then, the other pair of opposed walls of the tubular film are overlapped on each other, and heat-sealed along edges thereof by means of a linear heat-seal bar.

The heat-sealing process may be conducted by locally heating a portion of the laminated film by a heat sealer. In the present invention, the laminated film is preferably heat-sealed at a temperature not more than the melting point of the PBT resin constituting the outermost layer (A) and not less than the melting point of the heat-sealing resin constituting the innermost layer (B). Under such conditions, the outermost layer (A) is prevented from being melted, so that the laminated film can be heat-sealed while maintaining its shape, resulting in formation of uniform heat-sealed portions. The above effect can be more remarkably observed when those resins having a melting point lower by at least 50° C. (preferably at least 70° C.) than the melting point of the PBT resin are used as the heat-sealing resin.

Meanwhile, the crystallinity of the heat-sealed portion of the laminated film varies depending upon heat-sealing conditions such as hating temperature, heating time, cooling method after heating or the like. Even though the laminated film initially has a shape factor of not less than 2.2, the shape factor of the heat-sealed portions after heat-sealing undesirably differs from the initial value due to the change in crystallinity thereof. Therefore, the heat-sealing process is preferably conducted such that the shape factor of the heat-sealed portions is in the range of 1.6 to 2.4. More specifically, when the shape factor of the heat-sealed portions is controlled to not less than 1.6 by inhibiting the crystallization thereof, the heat-sealed portions can be enhanced in strength.

The packaging bag of the present invention can be used for packaging industrial products such as electronic parts as well as foods such as hams and sausages, and is especially suitable for packaging foods. Since the container (gusseted bag) of the present invention is free from curling at an open edge thereof, no inconvenience is caused when filling various products therein by a filling and packaging machine. In addition, since the packaging bag of the present invention has a cylinder portion composed of the laminated film having a shape factor of not less than 2.2, the haze thereof can be controlled to usually 2 to 20%, preferably 2 to 15%, resulting in excellent transparency of the obtained bag, i.e., excellent visibility of contents in the bag.

As described above, in accordance with the present invention, there are provided a laminated film which can be effectively prevented from being curled upon heat-sealing, and a packaging bag produced by heat-sealing the laminated film which can be suitably used in a filling and packaging machine. Therefore, the present invention exhibits a large industrial value.

EXAMPLES

The present invention is described in more detail by Examples and Comparative Examples, but the Examples are only illustrative and, therefore, not intended to limit the scope of the present invention thereto.

Various properties were measured by the following methods.

(1) Measurement of Shape Factor of Outermost Layer:

A 100 mm-square sheet specimen (laminated film) was sampled from the above tubular body, and the shape factor thereof was measured using the measuring conditions and.

(2) Evaluation of Curling Property:

A 100 mm-square sheet specimen (laminated film) was sampled from the above tubular body, and allowed to stand in a chamber maintained at a temperature of 23° C. and a humidity of 50% for 24 hours. Then, the curling property of the thus treated specimen was evaluated by the following method. That is, the specimen was placed on a horizontal table to examine the curling condition thereof. If the specimen was deformed up to a cylindrical shape, the diameter (mm) of the cylindrical shape was measured. If the specimen is deformed merely into a curved shape, the height (mm) thereof was measured. At the same time, the gusseted bag was observed to determine whether or not any curl was caused at an open end thereof.

(3) Haze:

The haze was measured according to JIS K 7105.

Example 1

A tubular body of a laminated film having a five-layer structure: Homo-PBT (layer thickness: 8 mm)/APO (layer thickness: 8 $\mu$m)/NY: Nylon 6 (layer thickness: 16 $\mu$m)/APO (layer thickness: 8 $\mu$m)/L-LDPE (layer thickness: 40 $\mu$m) was produced by a co-extrusion inflation and water-quenching method (downward water-cooling molding method) using a five-layer co-extrusion ring-shaped die, and wound up on a 3-inch paper tube. Upon the production of the above laminated film, polymethyl methacrylate (PMMA) fine particles having an average particle size of 6 $\mu$m as an anti-blocking agent were added in an amount of 2,000 ppm to the PBT. The extrusion temperature was 240° C., the water-cooling temperature was 25° C., the amount of cooling water fed was 15 liters/minute and the winding-up speed was 15 m/minute. The thus obtained tubular body was slit into a predetermined length, and the cut body was subjected to gusseting process, i.e., linearly heat-sealed along an edge thereof to obtain a gusseted bag. The thus obtained gusseted bag was measured and evaluated to determine properties thereof.

The layer structure and main production conditions of the laminated film are shown in Table 1, and the results of the measurement and evaluation of various properties of the laminated film and gusseted bag are shown in Table 2. In Table 2, the "inside" means the side where the innermost layer (heat-sealing resin) is located.

Example 2

The same procedure as defined in Example 1 was conducted except that Co-PBT was used instead of Homo-PBT, thereby producing a laminated film and a gusseted bag. As the Co-PBT, there was used a polybutylene terephthalate copolymer having a melting point of 222° C. and containing as a copolymerized component, polybutyleneoxide glycol having a number-average molecular weight of 1,000 in an amount of 2.5 mol %. The layer structure and main production conditions of the laminated film are shown in Table 1, and the results of the measurement and evaluation of various properties of the laminated film and gusseted bag are shown in Table 2.

Example 3

The same procedure as defined in Example 1 was conducted except that the gas-barrier resin layer (NY) was omitted from the layer structure in Example 2, thereby producing a laminated film and a gusseted bag. The layer structure and main production conditions of the laminated film are shown in Table 1, and the results of the measurement and evaluation of various properties of the laminated film and gusseted bag are shown in Table 2.

Comparative Examples 1 to 3

The same procedures as defined in Examples 1 to 3 were respectively conducted except that the amount of cooling water fed was changed to 8 liters/minute, thereby producing a laminated film and a gusseted bag. The layer structure and main production conditions of the laminated film are shown in Table 1, and the results of the measurement and evaluation of various properties of the laminated film and gusseted bag are shown in Table 2.

Comparative Example 4

The same procedure as defined in Example 1 was conducted except that the cooling method was changed to an air-cooling method, i.e., the extruded film was introduced upwardly from the die, cooled by spraying a cooling air thereto, and then wound up into a roll, thereby producing a laminated film and a gusseted bag. The layer structure and main production conditions of the laminated film are shown in Table 1, and the results of the measurement and evaluation of various properties of the laminated film and gusseted bag are shown in Table 2.

TABLE 1

| Examples and Comparative Examples | Layer structure | Cooling method | Cooling conditions: Cooling water temperature (° C.) | Cooling conditions: Amount of cooling water fed (1/min.) |
|---|---|---|---|---|
| Example 1 | Homo-PBT/APO/NY/APO/L-LDPE | Water-cooling | 25 | 15 |
| Example 2 | Co-PBT/APO/NY/APO/L-LDPE | Water-cooling | 25 | 15 |
| Example 3 | Co-PBT/APO/L-LDPE | Water-cooling | 25 | 15 |
| Comparative Example 1 | Homo-PBT/APO/NY/APO/L-LDPE | Water-cooling | 25 | 8 |
| Comparative Example 2 | Co-PBT/APO/NY/APO/L-LDPE | Water-cooling | 25 | 8 |
| Comparative Example 3 | Co-PBT/APO/L-LDPE | Water-cooling | 25 | 8 |
| Comparative Example 4 | Homo-PBT/APO/NY/APO/L-LDPE | Air-cooling | — | — |

TABLE 2

| Examples and Comparative Examples | Shape factor (La/Lb) | Curling (direction): Laminated film (mm) | Curling (direction): Gusseted bag | Haze (%) |
|---|---|---|---|---|
| Example 1 | 2.32 | 4 | None | 5.5 |
| Example 2 | 2.38 | 6 | None | 5.3 |
| Example 3 | 2.72 | 0 | None | 4.8 |
| Comparative Example 1 | 1.81 | 13 (winding diameter) | Occurred at inside | 12.3 |
| Comparative Example 2 | 1.86 | 25 | Occurred at inside | 11.8 |
| Comparative Example 3 | 2.12 | 26 | Occurred at inside | 9.5 |
| Comparative Example 4 | 1.81 | 7 (winding diameter) | Occurred at inside | 33.7 |

What is claimed is:

1. A laminated film produced by a co-extrusion inflation method, comprising:

an outermost layer (A) comprising a polybutylene terephthalate homopolymer, a polybutylene terephthalate copolymer or a mixture of the polybutylene terephthalate homopolymer and the polybutylene terephthalate copolymer; and an innermost layer (B) comprising a heat-sealing resin, said outermost layer (A) having a shape factor of not less than 2.2, which shows a peak shape of Raman spectrum thereof and is represented by the following formula (1):

$$\text{Shape factor}=La/Lb \quad (1)$$

Wherein La and Lb represent peak widths being present on higher- and lower-frequency sides, respectively, relative to a perpendicular line drawn from a peak top to a base line formed by a tangent line taken before and after the peak based on carbonyl stretching vibration, and being taken along a horizontal line at a height corresponding to one half of an intensity of the peak.

2. A laminated film according to claim 1, wherein said outermost layer (A) contains an anti-blocking agent.

3. A laminated film according to claim 2, wherein said anti-blocking agent is contained in an amount of 100 to 10,000 ppm based on the resin.

4. A laminated film according to claim 1, wherein said heat-sealing resin is selected from the group consisting off high-density polyethylene, medium density polyethylene, low-density polyethylene, polypropylene, ethylene-vinyl acetate copolymer, ethylene-methacrylate copolymer, ethylene-ethyl acrylate copolymer, ethylene-ethyl methacrylate copolymer, ethylene-acrylic acid copolymer, ethylene-methacrylic acid copolymer, adhesive polyethylene, ionomer resin, ethylene-vinyl acetate copolymer saponification product, linear low-density polyethylene and copolymers thereof.

5. A laminated film according to claim 1, wherein said outermost layer (A) has a thickness of 2 to 50 μm, and said innermost layer (B) has a thickness of 20 to 100 μm.

6. A laminated film according to claim 1, wherein the thickness of said innermost layer (B) is as large as two or more times the thickness of said outermost layer (A).

7. A laminated film according to claim 1, further comprising a gas-barrier resin layer (C) interposed between the outermost layer (A) and the innermost layer (B).

8. A laminated film according to claim 7, wherein said gas-barrier resin layer (C) is formed of polyamide, ethylene-vinyl acetate copolymer saponification product, polyethylene terephthalate, polyethylene naphthalate or polycarbonate.

9. A laminated film according to claim 7, wherein said gas-barrier resin layer (C) has a thickness of 5 to 70 μm.

10. A laminated film according to claim 1, further comprising an adhesive resin layer composed of a modified polyolefin resin, which is interposed between the respective layers.

11. A laminated film according to claim 10, wherein said adhesive resin layer has a thickness of 2 to 30 μm.

12. A laminated film according to claim 1, wherein the heat-shrinkage percentage in each of longitudinal (MD) direction and transverse (TD) direction of the film is not more than 5%.

13. A packaging bag obtained by heat-sealing the laminated film as defined in claim 1.

14. A packaging bag according to claim 13, which has a haze of 2 to 20%.

15. A laminated film produced by a co-extrusion inflation method, comprising:

an outermost layer (A) comprising a polybutylene terephthalate homopolymer, a polybutylene terephthalate copolymer or a mixture of the polybutylene terephthalate homopolymer and the polybutylene terephthalate copolymer;

an adhesive resin layer comprising a heat-sealing resin, an innermost layer (B) comprising a heat-sealing resin, said outermost layer (A) having a shape factor of not less than 2.2, which shows a peak shape of Raman spectrum thereof and is represented by the following formula (1):

$$\text{Shape factor}=La/Lb \qquad (1)$$

wherein La and Lb represent peak widths being present on higher- and lower-frequency sides, respectively, relative to a perpendicular line drawn from a peak top to a base line formed by a tangent line taken before and after the peak based on carbonyl stretching vibration, and being taken along a horizontal line at a height corresponding to one half of an intensity of the peak.

16. A laminated film produced by a co-extrusion inflation method, comprising:

an outermost layer (A) comprising a polybutylene terephthalate homopolymer, a polybutylene terephthalate copolymer or a mixture of the polybutylene terephthalate homopolymer and the polybutylene terephthalate copolymer;

an adhesive resin layer comprising a modified polyolefin resin, a gas-barrier resin layer (C) comprising polyamide, an ethylene-vinyl acetate copolymer saponification product, polyethylene terephthalate, polyethylene naphthalate or polycarbonate;

a second adhesive resin layer comprising a modified polyolefin resin; and an innermost layer (B) comprising a heat-sealing resin, said outermost layer (A) having a shape factor of not less than 2.2, which shows a peak shape of Raman spectrum thereof and is represented by the following formula (1):

$$\text{Shape factor}=La/Lb \qquad (1)$$

wherein La and Lb represent peak widths being present on higher- and lower-frequency sides, respectively, relative to a perpendicular line drawn from a peak top to a base line formed by a tangent line taken before and after the peak based on carbonyl stretching vibration, and being taken along a horizontal line at a height corresponding to one half of an intensity of the peak.

* * * * *